US009745076B2

(12) United States Patent
Bingham et al.

(10) Patent No.: US 9,745,076 B2
(45) Date of Patent: Aug. 29, 2017

(54) TUBULAR BAFFLE SYSTEM

(71) Applicant: BAE Systems plc, London (GB)

(72) Inventors: Christopher Steven Bingham, Warton (GB); Andrew James Irwin, Warton (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/307,419

(22) PCT Filed: May 6, 2015

(86) PCT No.: PCT/GB2015/051328
§ 371 (c)(1),
(2) Date: Oct. 28, 2016

(87) PCT Pub. No.: WO2015/170095
PCT Pub. Date: Nov. 12, 2015

(65) Prior Publication Data
US 2017/0050742 A1 Feb. 23, 2017

(30) Foreign Application Priority Data

May 7, 2014 (EP) .................................. 14275108
May 7, 2014 (GB) .................................. 1408021.2

(51) Int. Cl.
*B64D 37/32* (2006.01)
*B60K 15/03* (2006.01)
(Continued)

(52) U.S. Cl.
CPC .............. *B64D 37/32* (2013.01); *B60K 15/03* (2013.01); *B60K 15/077* (2013.01); *B64D 37/08* (2013.01);
(Continued)

(58) Field of Classification Search
CPC ........ B64D 37/32; B64D 37/08; B64D 37/06; F41H 5/0492; B60K 15/03006;
(Continued)

(56) References Cited

U.S. PATENT DOCUMENTS 1,392,892 A * 10/1921 Imber .................... B64D 37/06
220/560.03
2,060,078 A * 11/1936 Hobbs ....................... F28D 7/06
165/114
(Continued)

FOREIGN PATENT DOCUMENTS

CN 101445052 A 11/2008
CN 102514828 A 6/2012
(Continued)

OTHER PUBLICATIONS

International Preliminary Report on Patentability for PCT Application No. PCT/GB2015/051326, dated Nov. 8, 2016, 9 pages.
(Continued)

*Primary Examiner* — Robert J Hicks
(74) *Attorney, Agent, or Firm* — Maine Cernota & Rardin

(57) ABSTRACT

A baffle system includes a baffle (40) located in a tank (16) for containing liquid (e.g. an aircraft fuel tank). The baffle (40) is a tubular member through which a liquid may flow. The baffle (40) comprises: a first tubular portion (42) providing a tubular outer wall, and a second tubular portion (44) located within the first tubular portion (42) and providing a tubular inner wall. The first and second tubular portions (42, 44) are substantially parallel. The first and second tubular portions (42, 44) are spaced apart to define a chamber (46) therebetween. The baffle (42, 44) further comprises radial side walls between the first and second tubular portions (42,
(Continued)

44) such that the chamber (46) is a sealed chamber. The chamber (46) may be filled with a compressible gas or gaseous mixture.

10 Claims, 3 Drawing Sheets

(51) Int. Cl.
  *B64D 37/08* (2006.01)
  *F41H 5/04* (2006.01)
  *B60K 15/077* (2006.01)
(52) U.S. Cl.
  CPC .... *F41H 5/0492* (2013.01); *B60K 2015/0344* (2013.01); *B60K 2015/03407* (2013.01); *B60K 2015/0777* (2013.01); *B60Y 2200/51* (2013.01); *B64D 2037/325* (2013.01)
(58) Field of Classification Search
  CPC ...... B60K 15/03; B60K 15/077; B65D 25/04; B65D 25/08; B65D 1/24; B65D 1/36
  USPC .... 220/563, 562, 4.15, 4.14, 4.12, 501, 555, 220/553; 137/574, 576, 571; 244/135 B, 244/135 R, 172.3, 172.2
  See application file for complete search history.

(56) References Cited

U.S. PATENT DOCUMENTS

| | | | |
|---|---|---|---|
| 2,498,827 A * | 2/1950 | Shaw | F01P 11/08 165/132 |
| 2,850,083 A | 9/1958 | Frost | |
| 2,938,727 A | 5/1960 | Nosak | |
| 3,322,294 A | 5/1967 | Nemeth | |
| 3,400,854 A | 9/1968 | Conway et al. | |
| 3,784,050 A | 1/1974 | Pollack | |
| 3,804,292 A * | 4/1974 | Chiti | B60K 15/03 137/264 |
| 3,993,214 A | 11/1976 | Usab | |
| 4,013,190 A | 3/1977 | Wiggins et al. | |
| 4,248,342 A | 2/1981 | King et al. | |
| 4,251,005 A | 2/1981 | Sons et al. | |
| 5,816,332 A | 10/1998 | Alhamad | |
| 6,848,472 B2 | 2/2005 | Bambacigno | |
| 8,746,359 B2 | 6/2014 | Ruden | |
| 8,857,651 B2 | 10/2014 | Stelzl | |
| 9,249,931 B2 | 2/2016 | Morales | |
| 9,249,933 B2 | 2/2016 | Morales | |
| 2009/0078705 A1 | 3/2009 | Ramsay | |
| 2010/0236798 A1 | 9/2010 | Ruden | |
| 2011/0017748 A1 | 1/2011 | Palma | |
| 2011/0315699 A1 | 12/2011 | Nakajima | |

FOREIGN PATENT DOCUMENTS

| | | | | |
|---|---|---|---|---|
| DE | 10013750 A1 | 10/2001 | | |
| EP | 0689991 B1 | 1/1999 | | |
| EP | 1413514 A1 | 4/2004 | | |
| FR | 2101483 A5 | 3/1972 | | |
| GB | 543996 A | * | 3/1942 | ............ B64D 37/06 |
| GB | 1359458 A | 7/1974 | | |
| KR | 20090037635 A | 3/1977 | | |
| KR | 20120063665 A | 6/2012 | | |
| WO | 9725551 A2 | 12/1996 | | |
| WO | 2012173594 A1 | 12/2012 | | |

OTHER PUBLICATIONS

European Search Report for EP Application No. 14275109.8, dated Nov. 12, 2014, 8 pages.
Great Britain Combined Search and Examination Report for GB Application No. 1507733.2, dated Oct. 19, 2015, 7 pages.
Great Britain Exam Report for GB Application No. 1507733.2, dated Aug. 11, 2016, 3 pages.
Great Britain Search Report for GB Application No. 1408023.8, dated Oct. 27, 2014, 3 pages.
PCT Search Report and Written Opinion for PCT Application No. PCT/GB2015/051326, dated Jul. 7, 2016, 13 pages.
Amato Industries, amazon.com, Available from: http://www.amazon.com/Polypropylene-Pool-Rope-inch-White/dp/B0037TW6Q2 [accessed on Oct. 16, 2015].
European Search Report for EP Application No. 14275108.0, dated Nov. 11, 2014, 11 pages.
Great Britain Combined Search and Examination Report for GB Application No. 1507730.8, dated Oct. 19, 2015, 8 pages.
Great Britain Search Report for GB Application No. 1408021.2, dated Oct. 27, 2014, 3 pages.
International Preliminary Report on Patentability for PCT Application No. PCT/GB2015/051328, dated Apr. 25, 2016, 15 pages.
PCT Search Report and Written Opinion for PCT Application No. PCT/GB2015/051328, dated Jul. 1, 2015, 10 pages.

* cited by examiner

TUBULAR BAFFLE SYSTEM

RELATED APPLICATIONS

This application is a national phase application filed under 35 USC §371 of PCT Application No. PCT/GB2015/051328 with an International filing date of May 6, 2015 which claims priority of GB Patent Application 1408021.2 filed May 7, 2014 and EP Patent Application 14275108.0 filed May 7, 2014. Each of these applications is herein incorporated by reference in their entirety for all purposes.

FIELD OF THE INVENTION

The present invention relates to baffles for use in liquid storage tanks.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a baffle for locating in a tank for containing liquid. The baffle is a tubular member through which a liquid may flow. The baffle comprises a first tubular portion providing a tubular outer wall, and a second tubular portion located within the first tubular portion and providing a tubular inner wall. The first and second tubular portions are substantially parallel to each other. The first and second tubular portions are spaced apart to define a chamber between the first and second tubular portions (e.g. an annular chamber). The baffle further comprises radial side walls between the first and second tubular portions such that the chamber is a sealed chamber. The radial side walls may space apart the first and second tubular portions The chamber may be filled with a compressible gas or gaseous mixture.

The radial side walls may attach together the first and second tubular portions at or proximate to openings of the first and second tubular portions (i.e. at or proximate to ends of the baffle).

The baffle may be made of a carbon fibre composite material or a plastic.

The baffle may have a substantially circular cross section. An external diameter of the baffle may be in the range 10 mm to 100 mm. The baffle may be a substantially straight tubular member.

In a further aspect, the present invention provides a liquid storage tank and baffle system comprising a tank for containing a liquid, said tank enclosing a liquid storage space, and one or more baffles located within the liquid storage space. Each baffle is in accordance with any of the above aspects.

The baffles may be substantially straight members. The baffles may be arranged in the liquid storage space such that the baffles are substantially parallel to one another.

The baffles may substantially fill the liquid storage space within the tank.

The system may further comprise one or more spacers configured to space apart the ends of the one or more of the baffles from the tank.

The total cavity volume of the baffles in the liquid storage space may be less than or equal to 15% by volume of the liquid storage space volume.

The tank may be an aircraft fuel tank. The tank may be an aircraft wing fuel tank located in an aircraft wing. The one or more baffles may be aligned along a length of the aircraft wing (e.g. parallel to a lateral axis of the aircraft). Alternatively, the one or more baffles may be substantially perpendicular to a length of the aircraft wing (e.g. parallel to a longitudinal axis of the aircraft).

In a further aspect, the present invention provides a vehicle (e.g. an aircraft) comprising a liquid storage tank and baffle system in accordance with any of the above aspects.

In a further aspect, the present invention provides a liquid storage tank and baffle system comprising a tank for containing a liquid, said tank enclosing a liquid storage space, and a plurality of baffles located within the liquid storage space, each baffle being a tubular member through which a liquid within the tank may flow.

One or more of the baffles may be made of a material selected from the group of materials consisting of carbon fibre composite and plastic.

One or more of the baffles may have a substantially circular cross section and an external diameter in the range 10 mm to 100 mm.

One or more of the baffles may be a substantially straight tubular member. The baffles may be arranged in the liquid storage space such that the baffles are substantially parallel to one another.

The baffles may substantially fill the liquid storage space within the tank.

The system may further comprise one or more spacers configured to retain one or more of the baffles and the tank in a spaced apart relation.

The total cavity volume of the baffles in the liquid storage space may be less than or equal to 15% by volume of the liquid storage space volume.

One or more of the baffles may comprise a first tubular member providing an outer wall, and a second tubular member located within the first tubular member and providing an inner wall. The first and second tubular members may be spaced apart to define therebetween at least one chamber.

The first tubular member and the second tubular member may be sufficiently strong to resist at least the maximum and minimum hydrostatic pressures of a liquid in the tank. The at least one chamber may have a volume sufficient to allow a shock wave or waves in the liquid in the tank resulting from compression of the liquid by impact of a projectile on the tank and thus on the liquid to be reduced by expansion of the compressed liquid into the chamber.

The at least one chamber may contain a material having a density sufficiently different from the density of a liquid in the tank to provide substantially total reflection within the baffle of the shock wave or waves impinging on the baffle thereby to reduce the hydraulic ram pressure in the liquid.

The tank may be an aircraft fuel tank.

In a further aspect, the present invention provides a vehicle (for example, an aircraft) comprising a liquid storage tank and baffle system in accordance with the preceding aspect.

In a further aspect, the present invention provides a baffle for locating in a tank for containing liquid. The baffle comprises a first tubular member providing an outer wall, and a second tubular member located within the first tubular member and providing an inner wall. The first and second tubular members are spaced apart to define therebetween at least one chamber.

The first tubular member and the second tubular member may be sufficiently strong to resist at least the maximum and minimum hydrostatic pressures of a liquid in the tank. The at least one chamber may have a volume sufficient to allow a shock wave or waves in the liquid in the tank resulting from compression of the liquid by impact of a projectile on the tank and thus on the liquid to be reduced by expansion of the compressed liquid into the chamber.

DETAILED DESCRIPTION

Figure 1:
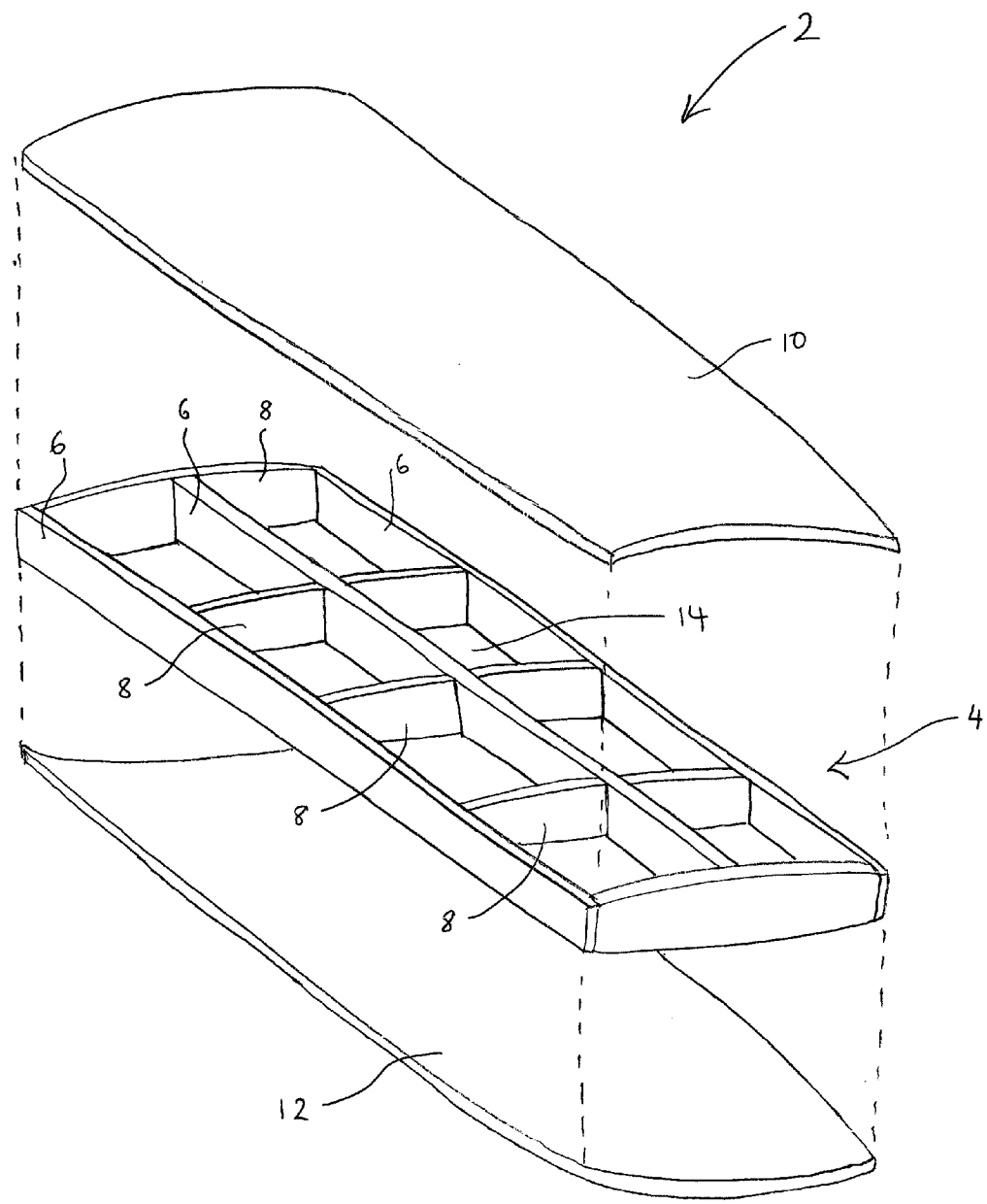
FIG. 1 is a schematic illustration (not to scale) of an exploded view of an example aircraft wing in which an embodiment of a baffle is implemented.

In the following description, like reference numerals refer to like elements.

The following description is based on embodiments of the invention and should not be taken as limiting the invention with regard to alternative embodiments that are not explicitly described herein. Structural material types and methods of construction provided herein are examples only.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an exploded view of an example aircraft wing 2 in which an embodiment of a hydrodynamic ram reducing baffle is implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

Figure 2:
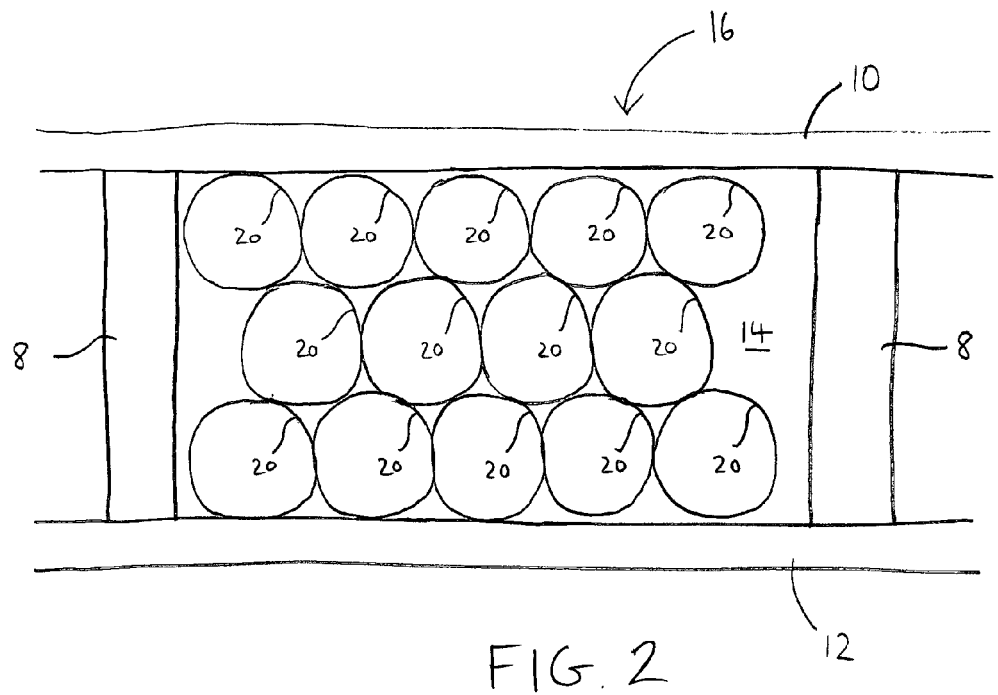
FIG. 2 is a schematic illustration (not to scale) showing a cross section through a fuel tank in which an embodiment of a hydrodynamic ram reducing baffle is implemented.

FIG. 2 is a schematic illustration (not to scale) showing a cross section through the fuel tank 16 in the aircraft wing 2 taken parallel to the length of the aircraft wing 2 (i.e. perpendicular to a longitudinal or roll axis of an aircraft to which the wing 2 is attached).

Figure 3:
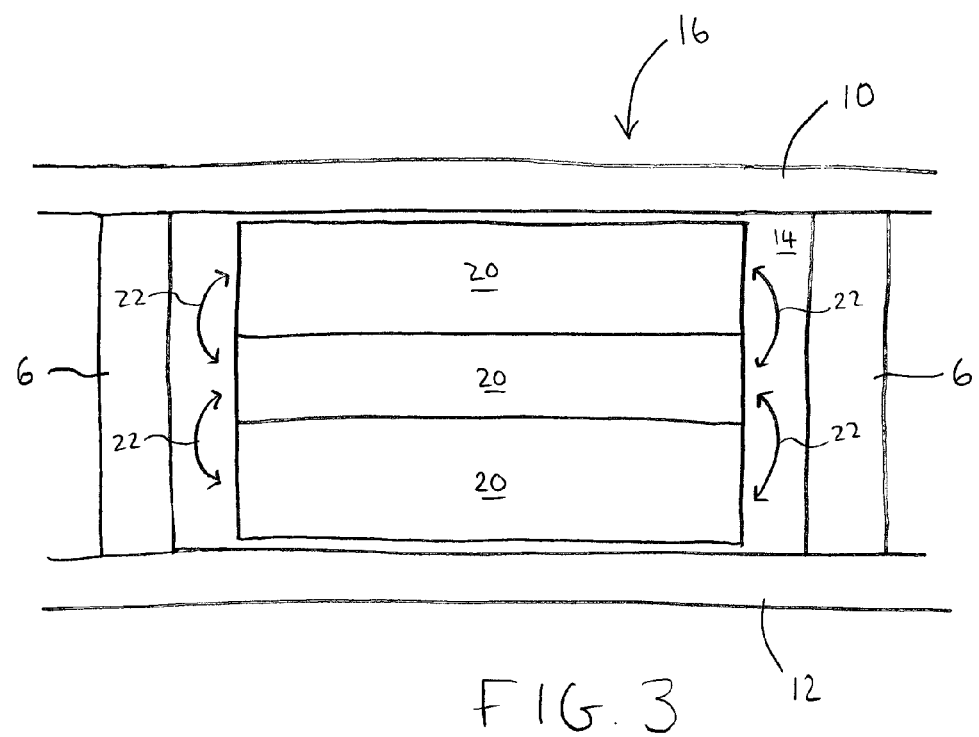
FIG. 3 is a schematic illustration (not to scale) showing a further cross section through the fuel tank.

FIG. 3 is a schematic illustration (not to scale) showing a further cross section through the fuel tank 16 in the aircraft wing 2 taken perpendicular to the cross section of FIG. 2 (i.e. perpendicular to the length of the aircraft wing 2).

In this embodiment, the outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises hydrodynamic ram reducing baffles 20.

In this embodiment, each baffle 20 is a substantially straight tube or pipe. Each baffle 20 is an elongate, hollow cylinder through which the fluid in the fuel tank 16 may flow.

In this embodiment, the baffles 20 are cylindrical in shape, i.e. have circular cross sections. However, in other embodiments, one or more of the baffles 20 has a different shaped cross section, i.e. other than circular.

In this embodiment, each baffle 20 has an external diameter in the range 30 mm to 40 mm (compared to a fuel tank depth of, for example, 250 mm). However, in other embodiments, one or more of the baffles 20 may have a different external diameter, for example, an external diameter in the range 10 mm to 30 mm, or alternatively in the range 40 mm to 100 mm.

In this embodiment, each of the baffles 20 is made of a strong, lightweight material, for example, CFC or a plastic. Preferably, the baffles 20 are sufficiently flexible to allow the aircraft wing 2 to flex during flight.

In this embodiment, the walls of the baffles 20 are relatively thin, for example a baffle wall may have a thickness in the range 0.25 mm to 1 mm, or in the range 1 mm to 5 mm. Preferably, the thicknesses of the baffle walls are such that the baffles 20 occupy less than 15% of the total internal volume (i.e. capacity) of the fuel tank 16. In other embodiments, the baffles 20 occupy a different proportion of the fuel tank capacity.

In this embodiment, the baffles 20 are arranged in the fuel tank 16 as overlapping and touching rows of baffles 20 between the upper skin 10 and the lower skin 12. Preferably, there is a sufficient number of rows of baffles 20 to provide that the rows of baffles 20 extend substantially from the top of the fuel tank 16 to the bottom of the fuel tank 16 (i.e. from the upper skin 10 to the lower skin 12). For reasons of clarity and convenience, the fuel tank 16 is depicted in FIGS. 2 and 3 as containing three rows of baffles 20 between the aircraft skins 10, 12. However, in practice there may be a different number of rows of baffles 20. Preferably, there are at least three rows of baffles 20. More preferably, there are at least five rows of baffles 20. More preferably, there are at least seven rows of baffles 20. More preferably, there are at least ten rows of baffles 20, for example ten or eleven rows.

As shown in FIG. 2, in this embodiment, the rows of baffles 20 extend substantially from one side of the fuel tank 16 to the opposite side of the fuel tank 16 (i.e. from the rib 8 at one side of the fuel tank to the rib 8 at the opposite side of the fuel tank 16). Preferably, the baffles 20 are arranged such that adjacent baffles 20 in a row touch. Preferably, there are gaps between the ends of each of the rows of baffles and the ribs 8 such that fluid within the fuel tank 16 is permitted to flow between the baffles 20 and the ribs 8.

As shown in FIG. 3, in this embodiment, the lengths of the baffles 20 are such that the baffles extend substantially from one side of the fuel tank 16 to the opposite side of the fuel tank 16 (i.e. from the spar 6 at one side of the fuel tank to the spar 6 at the opposite side of the fuel tank 16). Preferably, the lengths of the baffles 20 are such that there are gaps between the ends of the baffles 20 and the spars 6 such that fluid within the fuel tank 16 is permitted to flow between the baffles 20 and the ribs 8, i.e. such that fluid may flow from one baffle 20 to a different baffle 20 as indicated in FIG. 3 by double headed arrows and the reference numeral 22.

In this embodiment, the baffles 20 are arranged in the fuel tank 16 such that the longitudinal axes of the baffles 20 are substantially perpendicular to a direction that points along the length of the aircraft wing 2. However, in other embodiments, one or more of the baffles 20 has a different orientation. For example, in some embodiments, the baffles 20 are arranged in the fuel tank 16 such that the longitudinal axes of the baffles 20 are parallel with a direction that points along the length of the aircraft wing 2. In some other embodiments a random orientation may be used for the individual baffles 20.

In some embodiments, spacers are used to keep the baffles 20 spaced apart from one or more of the internal walls of the fuel tank 16. For example, in some embodiments, spacer devices are used at the ends of the baffles 20 so that the baffles 20 remain spaced apart from the spars 6, i.e. such that a gap is retained between the baffles 20 and the spars 6. This advantageously maintains a flow path for the fluid within the fuel tank 16 to flow from one baffle 20 to another baffle 20. This tends to allow for the free movement of fuel within the fuel tank, thereby providing that the fuel is uniformly distributed within the tank. Examples of appropriate spacer devices include, but are not limited to, structures made of open-cell foam which permit the flow of fluid therethrough. In some embodiments, spacer devices may be used to keep the baffles 20 spaced apart from one another, and/or from the aircraft skins 10, 12. This advantageously tends to reduce or eliminate chaffing damage to the baffles 20 and/or the walls of the fuel tank 16.

In this embodiment, the baffles 20 are not fixedly attached together. In other words, the baffles 20 are arranged in the fuel tank 16 such that they may move, at least to some extent, with respect to one another. However, in other embodiments, the baffles 20 are attached to one another so that the relative positions of the baffles 20 are fixed.

In this embodiment, the baffles 20 are not fixedly attached to the spars 6.

Thus, the baffles 20 are free to move, at least to some extent, within the fuel tank 16 relative to the spars 6. Also, in this embodiment, the baffles 20 are not fixedly attached to the ribs 8. Thus, the baffles 20 are free to move, at least to some extent, within the fuel tank 16 relative to the ribs 8. Also, in this embodiment, the baffles 20 are not fixedly attached to the upper skin 10. Thus, the baffles 20 are free to move, at least to some extent, within the fuel tank 16 relative to the upper skin 10. Also, in this embodiment, the baffles 20 are not fixedly attached to the lower skin 12. Thus, the baffles 20 are free to move, at least to some extent, within the fuel tank 16 relative to the lower skin 12.

Preferably, the number and arrangement of the baffles 20 within the fuel tank 16 is such that there is insufficient space in the fuel tank 16 in which to place a further baffle 20. In other words, preferably the fuel tank 16 is "filled" with baffles 20 so that a further baffle does not fit into the fuel tank 16. In other words, preferably the baffles 20 fill the entire liquid volume space in the fuel tank 16.

As will now be described in more detail, the baffles 20 are operable to reduce hydrodynamic ram pressure in the fuel contained within the fuel tank 16 resulting from impact of a projectile with an external surface of the fuel tank 16.

Figure 4:
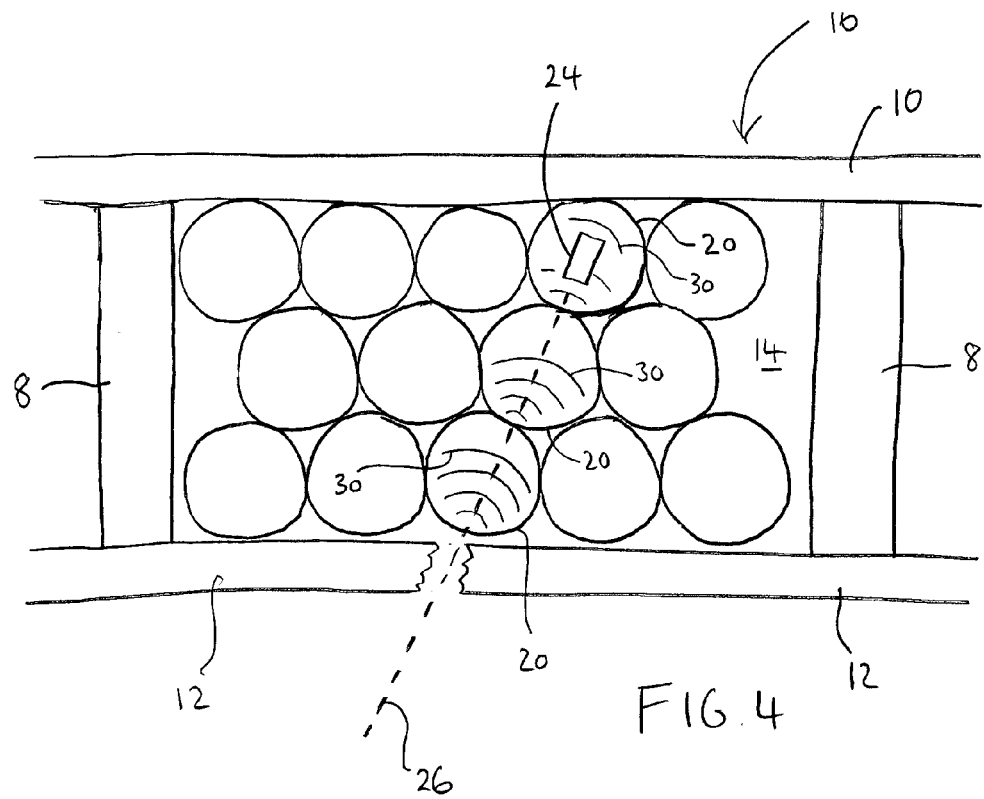
FIG. 4 is a schematic illustration (not to scale) illustrating effects of a projectile impacting with an external surface of the fuel tank.

FIG. 4 is a schematic illustration (not to scale) illustrating effects of a projectile 24 impacting with the lower skin 12 of the fuel tank 16. The path of the projectile through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

In this example, after passing through the lower skin 12, the projectile 24 impacts with and travels through (i.e. pierces or penetrates) multiple baffles walls. In other examples, the projectile 24 may impact with only a single baffle 20. In other examples, the projectile 24 does not pierce a baffle wall or only pierces a single baffle wall.

The projectile impacting with a baffle 20 tends to cause that baffle 20 to be deflect and accelerate within the fluid at least to some extent. Also, the projectile 24 impacting with a baffle 20 tends to cause that baffle 20 to move within the fluid in the fuel tank 16 with respect to the walls of the fuel tank 16. This in turn tends to cause deflection and/or movement of multiple other baffles 20 within the fuel tank 16, for example, due to the impinged upon baffle 20 being in contact with multiple other baffles 20. Thus, impact kinetic energy of the projectile 24 tends to be used to deflect and accelerate the baffles 20 through the fluid in the fuel tank 16, thereby reducing the energy introduced into the fluid.

Moving the baffles 20 through the fluid tends to provide that, in effect, the projectile 24 experience a greater drag force when moving through the fluid in the fuel tank 16 compared to that that would be experienced were the baffles 20 not present. Thus, the passage of the projectile 24 through the fluid in the fuel tank 16 tends to be retarded. The retardation of the passage of the projectile 24 through the fluid tends to decrease the likelihood of the projectile 24 impacting with the upper skin 10. Thus, the likelihood of a hole being formed in the upper skin 10 tends to be reduced. Furthermore, the increase in drag on the projectile 24 tends to mean that a greater portion of the impact energy is absorbed by the fluid in the fuel tank 16. Thus, forces exerted on the walls of the fuel tank 16 tend to be reduced.

Also, in this example, when the projectile 24 travels through the wall or walls of a baffle 20, impact energy of the projectile 24 tends to be used to pierce those baffle walls. Thus, the energy introduced into the fluid by the projectile 24 tends to be reduced, and the passage of the projectile 24 into the fluid is retarded at least to some extent.

At least some of the impact energy of the projectile 24 tends to be absorbed by the baffles 20 and therefore not transferred to the aircraft substructure 4.

In this example, on piercing a wall of a baffle 20, the projectile 24 impacts with the fluid within that baffle 20, thereby generating one or more high pressure shock waves 30 within the fluid within that baffle 20. In this example, a respective shockwave 30 or set of shockwaves 30 is generated within the fluid within each baffle 20 that is penetrated by the projectile 24. The walls of the baffles 20 tend to reflect incident shock waves 30 at least to some extent. Also, the walls of the baffles 20 tend to be relatively poor transmitters of impinging shock waves 30. Thus, each baffle 20 tends to restrain or retain shockwaves 30 generated therein at least to some extent. Through multiple shockwave reflections in the fuel tank 16 and the attenuation properties of the liquid, the amplitude of the shock waves 30 tends to be reduced and consequently the pressure experienced by the substructure 4 tends to be diminished by the presence of the baffles 20.

Also, the shock waves 30 generated within the baffles 20 tend to be of lower energy than a shock wave or shock waves experienced in a conventional system due to at least some of the impact energy of the projectile 24 being absorbed by the baffles. In addition, each baffle 20 advantageously tends to limit the distance over which the shock wave can develop. Furthermore, the baffles 20 tend to disrupt the shockwaves 30 travelling through the fluid in the fuel tank 16 and thereby tend to insulate the upper and lower skins 10, 12 at least to some extent. Thus, pressures resulting from the shock waves 30 exerted on the walls of the fuel tank 16 tend to be lower than the shock wave pressures experienced in conventional fuel tanks. Thus, the likelihood of damage to the walls of the fuel tank 16 (e.g. decoupling of the external skin 10, 12 from the spars 6 or ribs 8) tends to be reduced.

The baffles 20 advantageously tend to decouple the fluid from walls of the fuel tank 16 at least to some extent.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. The baffles 20 tend to prevent or oppose the formation of a single large cavity in the wake of the projectile 24. Instead, multiple smaller cavities may be formed in the fluid within each of the baffles 20 through which the projectile 24 passes. Thus, the increased fluid pressure resulting from cavitation caused by the projectile 24 tends to be constrained within each baffle 20 and decreased compared to conventional systems. This tends to be facilitated by the passage of the projectile 24 through the fuel tank 16 being retarded at least to some degree by the baffles 20. As a result, pressures resulting from cavitation exerted on the walls of the fuel tank 16 tend to be lower than in conventional systems. Consequently, the likelihood of damage to the walls of the fuels tank 16 (e.g. decoupling of the external skin 10, 12 from the spars 6 or ribs 8) tends to be reduced.

Advantageously, the baffles 20 are located in the fuel tank 16 so that a shock wave or waves resulting from compression of the liquid in the tank resulting from impact of the projectile 24 on the external surface of the fuel tank 16 impinges on at least one of the baffles 20 and so that the shock wave or waves interact with at least one baffle 20 before impinging on the tank external boundary surfaces.

An advantage provided by the above described baffle is that hydrodynamic ram damage to a fuel tank caused by an object impacting with an external surface of the fuel tank tends to be reduced or eliminated. Hydrodynamic pressures and their associated structural responses tend to be reduced or eliminated. Thus, the likelihood of catastrophic failure of the fuel tank structure and corresponding aircraft loss tends to be reduced or eliminated.

The above described baffle advantageously tends to be relative easy and cheap to manufacture.

The above described baffle tends to be relatively easy to retrofit to existing aircraft fuel tanks.

The above described baffle tends to provide protection against hydrodynamic ram damage whilst occupying a relatively small amount of the fuel tank's capacity.

The above described baffle tends to be relatively lightweight so as not to be a significant burden to the aircraft.

In the above embodiments, the baffles are implemented in an aircraft wing fuel tank. However, in other embodiments, the baffles are used in a different type of container for containing fluid. In some embodiment, one or more walls of the container may be made of a different material to that described above.

In the above embodiments, each baffle is a tube made of a relatively thin layer of material. However, in other embodiments, the walls of the baffles are of a different construction, for example, as will now be described.

Figure 5:
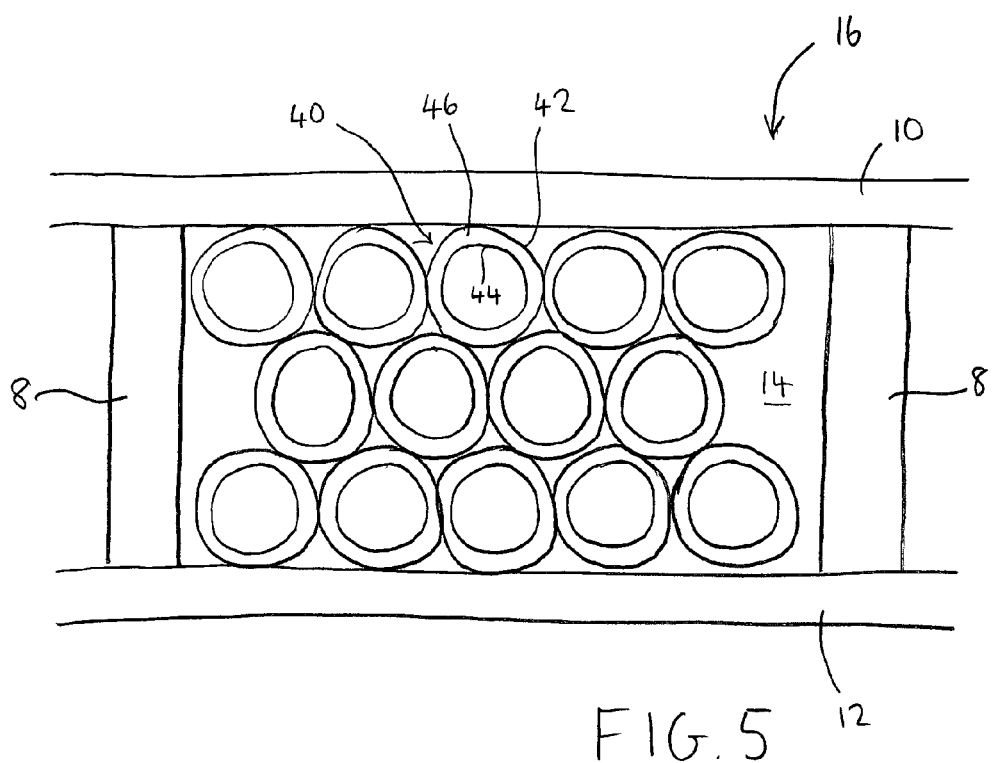
FIG. 5 is a schematic illustration (not to scale) showing a cross section through a fuel tank in which a further embodiment of a hydrodynamic ram reducing baffle is implemented.

FIG. 5 is a schematic illustration (not to scale) showing a cross section through the fuel tank 16 in which a further embodiment of hydrodynamic reducing baffles (hereinafter referred to as the "further baffles") is implemented. A further baffle is indicated in FIG. 5 by the reference numeral 40.

In this further embodiment, the further baffle 40 comprises an outer wall 42 and an inner wall 44 which are spaced apart to define therebetween at least one chamber 46.

In this further embodiment, the outer wall 42 is a substantially straight tube or pipe having a substantially circular cross section and within which is located the inner wall 44 and the chamber 46. In other embodiments the cross section may be alternative in shape.

In this further embodiment, the inner wall 44 is a substantially straight tube or pipe through which the fluid in the fuel tank 16 may flow and having a substantially circular cross section. In other embodiments the cross section may be alternative in shape. The inner wall 44 is located within the outer wall 42. The outer wall 42 and the inner wall 44 may be connected together, for example, at the ends of the further baffles 40 such that the chamber 46 is a sealed chamber. The outer wall 42 and the inner wall 44 may have spacers located between them at points along their length.

In this further embodiment, the or each chamber 46 contains a compressible gas or gaseous mixture such as air at reduced, atmospheric, or enhanced pressure. In some embodiments, the or each chamber 46 contains a different material, such as a liquid or a solid instead of or in addition to the compressible gas or gaseous mixture. For example, in some embodiments, the or each chamber 46 contains a compressible or crushable foam.

The dimensions of the further baffles 40 may be the same as those of the baffles 20 which are described in more detail above with reference to FIGS. 2 to 4.

The material from which further baffles 40 are made may be the same as those from which the baffles 20 are made, which are described in more detail above with reference to FIGS. 2 to 4.

The arrangement of the further baffles 40 within the fuel tank 16 may be the same as that of the baffles 20, which are described in more detail above with reference to FIGS. 2 to 4.

In this further embodiment, the walls 42, 44 of the further baffles 40 are sufficiently strong to withstand the pressure of the gas or gaseous material contained in the cavity 46 and are spaced apart in each further baffle 40 by an amount sufficient to provide at least one cavity 46 with a volume sufficient to allow a shock wave or waves in the liquid in the fuel tank 16, resulting from compression of the liquid by impact of a projectile on the tank external surface and thus in the liquid, to be reduced by expansion of the compressed liquid into the cavity volume, thereby to reduce the hydraulic ram pressure in the liquid in the fuel tank 16. Additionally, the gas or gaseous mixture in the or each cavity 46 has a density sufficiently different from the density of the liquid in the fuel tank 16 to provide substantially total reflection within the further baffle 40 of the shock wave or waves impinging on that further baffle 40 thereby to reduce the hydraulic ram pressure in the liquid in the fuel tank 16.

Additionally, the walls 42, 44 of the further baffles 40 are sufficiently strong to withstand the maximum and minimum hydrostatic pressures of the liquid in the fuel tank 16, at least up to the maximum aircraft manoeuvre rate.

In this further embodiment, the further baffles 40 are placed in the fuel tank 16 such that a shock pulse generated by a projectile impact the tank walls will impinge on at least one further baffle 40 before impinging upon an opposing tank wall. In defeating the hydraulic ram pressure the further baffles 40 serve two functions. Firstly energy from the hydraulic ram shock wave tends to be absorbed by expansion of the liquid into the space created by irreversible or reversible compression of the further baffle 40, i.e. movement of the outer wall 42 and/or the inner wall 44 of a further baffle 40 into the cavity 46 of that further baffle 40. Secondly, each further baffle 40 due to the large shock impedance mismatch between the further baffle 40 and the liquid in the fuel tank 16 behaves as a good shock wave reflector and a poor shock wave transmitter.

Through multiple shock wave reflections in the fuel tank 16 and the attenuation properties of the liquid, the shock wave amplitude is reduced and consequently the pressure experienced by the substructure 4 is diminished.

In the above embodiments, the baffles are implemented in an aircraft wing fuel tank. However, in other embodiments, the baffles are used in a different type of container for containing fluid. In some embodiment, one or more walls of the container may be made of a different material to that described above.

In some embodiments, one or more of the baffles comprises one or more rigid or flexible or foam construction barriers along the channel through which the fluid may flow. Such barriers may retard the passage of shockwaves generated within that baffle along the length of that baffle.

What is claimed is:

1. An aircraft fuel tank and baffle system comprising:
   an aircraft wing fuel tank located in an aircraft wing, said fuel tank enclosing a fuel storage space; and
   one or more baffles located within the fuel storage space, wherein each baffle is a tubular member through which a liquid may flow; the one or more baffles are aligned along a length of the aircraft wing; each baffle comprises:
   a first tubular portion providing a tubular outer wall; and
   a second tubular portion located within the first tubular portion and providing a tubular inner wall;
   for each baffle, the first and second tubular portions of that baffle are substantially parallel;
   for each baffle, the first and second tubular portions of that baffle are spaced apart to define a chamber therebetween; and
   each baffle further comprises radial side walls between its first and second tubular portions such that the chamber of that baffle is a sealed chamber.

2. The aircraft fuel tank and baffle system (40) according to claim 1, wherein the chamber (46) is filled with a compressible gas or gaseous mixture.

3. The aircraft fuel tank and baffle system (40) according to claim 1, wherein , for each baffle, the radial side walls of that baffle attach together the first and second tubular portions (42, 44) at or proximate to openings of the first and second tubular portions (42, 44).

4. The aircraft fuel tank and baffle system (40) according to claim 1, wherein each baffle (40) is made of a material selected from the group of materials consisting of carbon fibre composite and plastic.

5. The aircraft fuel tank and baffle system (40) according to claim 1, wherein each baffle (40) has a substantially circular cross section and an external diameter in the range 10 mm to 100 mm.

6. The aircraft fuel tank and baffle system (40) according to claim 1, wherein each baffle (40) is a substantially straight tubular member.

7. The aircraft fuel tank and baffle system according to claim 1, wherein the one or more baffles (40) substantially fill the liquid storage space (14) within the tank (16).

8. The aircraft fuel tank and baffle system according to claim 1, the system further comprising one or more spacers configured to space apart the ends of the one or more of the baffles (20, 40) from the tank (16).

9. The aircraft fuel tank and baffle system according to claim 1, wherein the total cavity volume of the one or more baffles (40) in the liquid storage space (14) is less than or equal to 15% by volume of the liquid storage space volume.

10. An aircraft comprising an aircraft fuel tank and baffle system in accordance with claim 1.

* * * * *